United States Patent [19]

Janutta et al.

[11] Patent Number: 4,878,319

[45] Date of Patent: Nov. 7, 1989

[54] MACHINE TOOL

[75] Inventors: Reinhard Janutta; Franz Hartmann, both of Geesthacht; Gerd Hinzmann, Lauenburg, all of Fed. Rep. of Germany

[73] Assignee: Körber AG, Hamburg, Fed. Rep. of Germany

[21] Appl. No.: 246,984

[22] Filed: Sep. 20, 1988

[30] Foreign Application Priority Data

Oct. 2, 1987 [DE] Fed. Rep. of Germany ....... 3733346

[51] Int. Cl.⁴ .............................................. B24B 55/00
[52] U.S. Cl. .................................................... 51/271
[58] Field of Search ............. 51/271, 268, 91 R, 92 R, 51/57, 59 R, 64, 231

[56] References Cited

U.S. PATENT DOCUMENTS 4,584,759  4/1986  Bleich ............................... 51/166 R
4,607,460  8/1986  Mushardt ........................ 51/165 TP
4,670,964  6/1987  Bleich ................................ 51/166 R Primary Examiner—Roscoe V. Parker
Attorney, Agent, or Firm—Peter K. Kontler

[57] ABSTRACT

A machine tool, particularly a grinding machine, wherein one or more machine elements (such as a wheelhead, a table or a saddle) are movable along guideways in or on the machine frame. Each of the guideways is overlapped or shielded by a guard, and each guard is movable by a discrete prime mover in synchronism with the respective machine element so that the width of clearances (if any) between the guards and the respective machine elements remains constant. The provision of discrete prime movers for the guards ensures that the machine tool can treat workpieces with a higher degree of accuracy because the prime movers for the machine elements are not affected by the weight, inertia and/or other parameters of the guards.

14 Claims, 3 Drawing Sheets

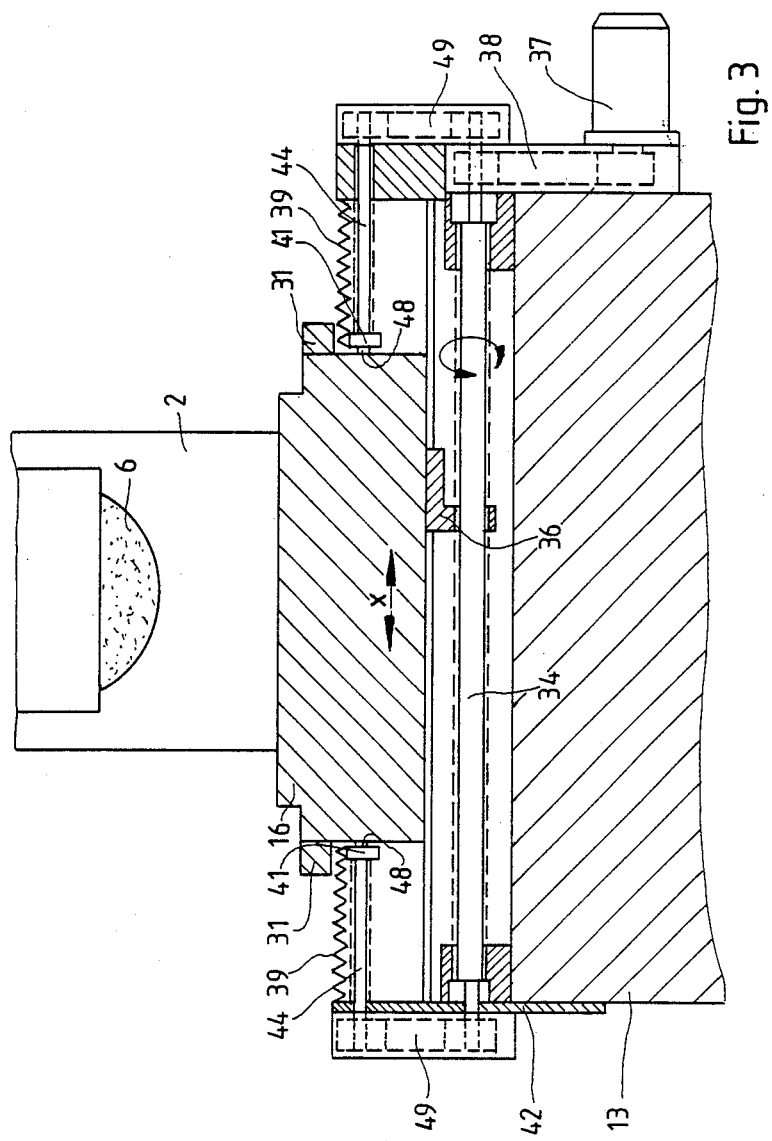

MACHINE TOOL

BACKGROUND OF THE INVENTION

The invention relates to machine tools in general, especially to grinding machines, and more particularly to improvements in means for protecting the guideways for mobile elements in machine tools.

It is customary to provide a machine tool with guards which overlap the guideways for wheelheads, saddles, tables and other mobile machine elements in order to shield such guideways from splashing coolant, lubricant and/or fragments of material which is being removed from a workpiece by one or more rotary, reciprocatory and/or otherwise movable tools. Such guards are normally disposed between the work area (e.g., the station where one or mor rotary grinding wheels remove material from a workpiece which is held between a headstock and a tailstock) on the one hand and the machine element(s) and the prime mover(s) therefor on the other hand. The guards can include bellows, tubular, trough-shaped or otherwise configurated components which are telescoped into each other, and/or otherwise configurated parts which are designed to prevent a lubricant, a coolant or particles of solid material from impinging upon and/or depositing on the guideways and/or on the prime mover or prime movers for one or more mobile machine elements.

In many presently known machine tools, the guards are attached to and are thus compelled to share the movements of the respective machine elements along their guideways. This can affect the accuracy of treatment which is carried out by such machine tools because the inertia, weight and/or other parameters can undesirably influence the movements of the respective machine element or elements and of the tool or tools which are mounted on and rotate, reciprocate and/or otherwise move with or relative to the associated machine elements. The so-called stick-slip effect is one of the phenomena which can affect the accuracy of treatment of workpieces in a grinding machine or another machine tool if the prime mover which imparts motion to a machine element is required to pull or push a guard jointly with the corresponding machine element. The reason is that the guards are normally in frictional engagement with their guides and their resistance to movement with the associated machine elements can vary within a wide range in response to abrupt acceleration or deceleration of the prime mover or prime movers. All this exerts an undue influence upon the quality of treatment of workpieces. For example, the influence of a guard which is to be pushed or pulled by the prime mover for a wheelhead in a grinding machine is quite pronounced when such machine is required to treat workpieces with a high or very high degree of accuracy, e.g., so that the tolerances cannot exceed a few thousandths of one millimeter.

OBJECTS OF THE INVENTION

An object of the invention is to further enhance the accuracy of treatment of workpieces in grinding machines and other types of machine tools.

Another object of the invention is to provide novel and improved means for imparting motion to mobile guards for guideways and prime movers in grinding machines and other types of machine tools.

A further object of the invention is to provide a grinding machine or another machine tool with novel and improved means for preventing a lubricant, a coolant and/or particles of removed material from reaching certain sensitive parts, particularly the guideways and the prime movers for mobile machine elements.

An additional object of the invention is to provide novel and improved means for synchronizing the movements of machine elements in grinding machines and other types of machine tools with the movements of associated guards for guideways and/or other sensitive parts of such machines.

Still another object of the invention is to provide a novel and improved method of shielding guideways and like parts of machine tools from splashing coolant and/or lubricant as well as from floating particles of dust and/or particles of material which is removed from workpieces.

A further object of the invention is to provide a novel and improved grinding machine which can treat workpieces with a degree of accuracy exceeding that in conventional grinding machines.

SUMMARY OF THE INVENTION

The invention is embodied in a machine tool, particularly in a grinding machine, which comprises a frame, guide means provided on the frame, at least one machine element which is movable along the guide means, at least one mobile guard (such as a splash guard) for the guide means, first prime mover means for the machine element, and discrete second prime mover means for the guard.

The machine tool can further comprise means for operating the second prime mover means so that the guard follows the movements of the machine element along the guide means. The guard and the machine element can define a clearance, and the operating means for the second prime mover means can include signal generating means for monitoring the clearance and means for controlling the second prime mover means in response to signals from the monitoring means so as to maintain the width of the clearance at a constant value. For example, the width of the clearance can be a minute fraction of an inch. The arrangement can be such that the operating means includes means for operating the second prime mover means in synchronism with the first prime mover means.

The guard can include at least one bellows. Alternatively, or in addition to such bellows, the guard can comprise first and second components one of which is telescoped into the other compoent; at least the first component is movable by the second prime mover means relative to the second component.

The frame can include a column and the guide means can be provided on and can extend substantially vertically along the column. The machine element of such machine tool can comprise a carrier (e.g., the wheelhead of a grinding machine) which is reciprocable along the guide means and at least one rotary tool spindle which is journalled in the carrier. The guard can include a substantially plate-like member which overlies the guide means. The carrier can be disposed at a level above the guard and the plate-like member of such guard can include a topmost portion which is closely adjacent the carrier. The second prime mover means then includes means for moving the guard up and down with reference to the guide means so that the topmost portion of the plate-like member remains closely adjacent the carrier. Such machine tool can further comprise means (for example, a table) defining a work area (material removing station) for the tool on the spindle, means for supplying a suitable coolant into the work area, and means for collecting the coolant which is supplied to the work area. A bottom portion of the plate-like member of the guard is preferably arranged to dip into the coolant in the collecting means. The spindle can be mounted for rotation about a substantially horizontal axis, and the collecting means can include an elongated vessel (e.g., a relatively narrow trough) which extends transversely of the axis of the spindle. The vessel is preferably disposed between the table of the work area defining means and the guide means.

The machine tool can be further provided with at least one cover (e.g., an elastic sealing lip) which overlies the clearance between the guard and the machine element.

The machine tool can be provided means for transmitting motion between the first and second prime mover means. Thus, it is possible to employ a single motor which drives the first prime mover means, and the second prime mover means can derive motion from such single motor or from an output member of the first prime mover means.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
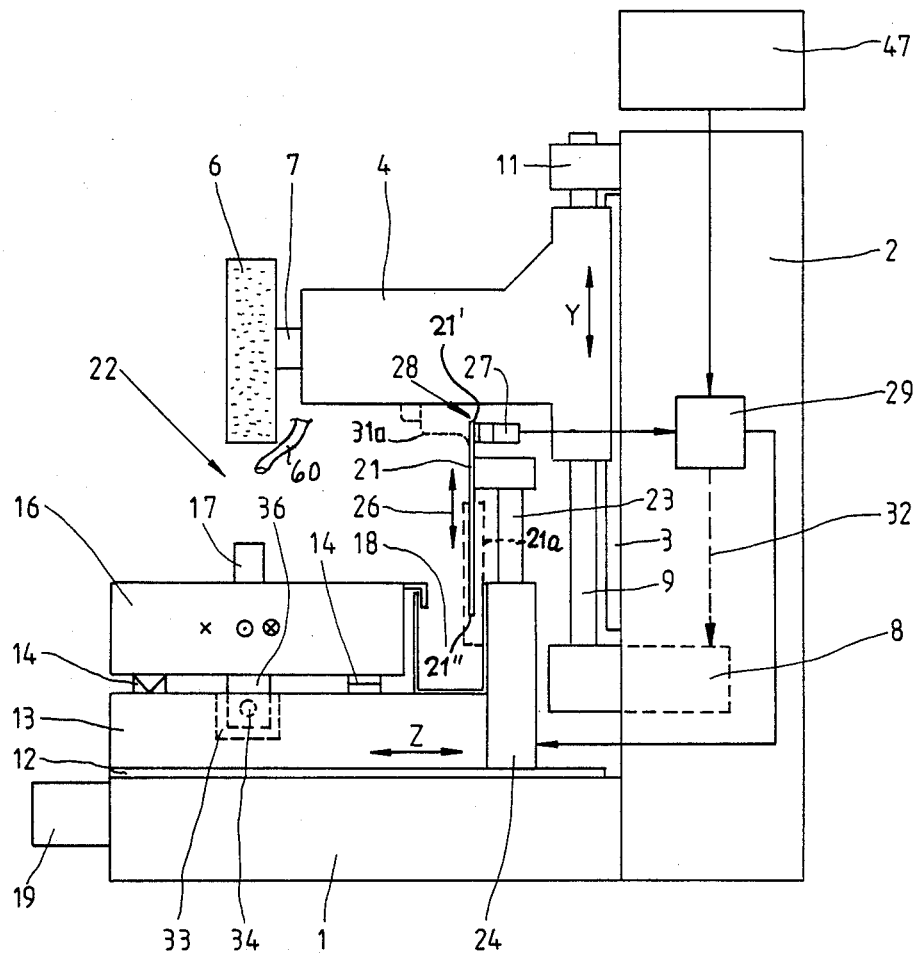
FIG. 1 is a side elevational view of a machine tool which constitutes a grinding machine and embodies one form of the present invention.

Referring first to FIG. 1, there is shown a machine tool which constitutes a grinding machine having a frame which includes a base or bed 1 and an upright column 2. The front side of the column 2 is provided with or supports guide means or guideways 3 defining a substantially vertical path for reciprocatory movements of a carrier or wheelhead 4 forming part of a machine element which further includes a horizontal tool spindle 7 rotatably journalled in the carrier 4. The double-headed arrow Y indicates the directions of vertical movements of the wheelhead or carrier 4 along the guideways 3 in response to starting of a first prime mover including a reversible electric or other suitable motor 8 and a ball screw spindle 9 serving as a means for transmittingmotion from the motor 8 to the carrier 4. The upper end portion of the spindle 9 is mounted in a bracket 11 at the front side of the column 2. The spindle 7 is driven by a separate motor (not shown) and carries one or more grinding wheels 6 (one shown) which can remove material from a workpiece 17 located in a work area (grinding station) 22 and supported by a second machine element in the form of a table 16 which defines a portion of the work area 22.

The base or bed 1 of the machine frame supports horizontal guideways 12 which are parallel to the axis of the tool spindle 7 and movably support and guide a support 13 which constitutes an additional mobile machine element and is reciprocable in directions indicated by a double-headed arrow Z. The support 13 carries additional horizontal guideways 14 which extend in the direction of the X-axis (i.e., at right angles to the axes denoted by the arrows Y and Z) and movably support and guide the table 16. The means for releasably clamping the workpiece 7 on the table 16 so that the workpiece is compelled to share the movements of the support 13 along the guideways 12 and/or the movements of the table 16 along the guideways 14 forms no part of the present invention. A coolant- and/or lubricant-collecting vessel 18 is installed on the support 13 between the table 16 and the guideways 3 so that it extends substantially transversely of the axis of the spindle 7, i.e., in parallelism with the X-axis of the grinding machine. The means for supplying coolant and/or lubricant into the work area 22 includes one or more spray nozzles 60 or any other suitable liquid conveying and dispersing means. The thus supplied liquid medium cools and/or lubricates the workpiece 17 on the table 16 and entrains the removed material into the vessel 18 which can constitute an elongated narrow horizontal trough behind the table 16 and in front of a one-piece or composite guard which is constructed, mounted and movable in accordance with a feature of the present invention.

The reference character 19 denotes a prime mover which is mounted on the base or bed 1 and serves to move the support 13 along the guideways 12.

The improved guard for the guideways 3 and the prime mover 8, 9 includes a substantially vertical plate-like member 21 which is movable up and down (note the double-headed arrow 26) in synchronism with the carrier 4 for the tool spindle 7 and has a topmost portion 21' which defines with the carrier 4 a relatively narrow clearance or gap 28 (the width of this clearance can be a minute fraction of one inch). The plate-like member 21 of the guard is mounted at the upper end of a vertical feed screw 23 forming partof a discrete prime mover which further incudes a reversible electric or other suitable motor 24 constituting a means for rotating the feed screw 23 in a clockwise or in a counterclockwise direction.

The means for operating the motor 24 of the prime mover for the plate-like member 21 includes a signal generating sensor or monitoring device 27 which is affixed to the member 21 in the region of the topmost portion 21' and can constitute or include a proximity detector. The monitoring device 27 transmits signals which denote the width of the clearance 28 between the topmost portion 21' of the member 21 and the adjacent portion of the carrier 4. Such signals are transmitted to a control circuit 29 which, in turn, tranmits appropriate signals to the motor 24 so that the member 21 moves up or down in response to upward or downward movement of the carrier 4 along the guideways 3 and the width of the clearance 28 remains at least substantially unchanged. The motor 24 is preferably of the type which can react practically instantaneously, i.e., so that the width of the clearance 28 remains unchanged during each and every stage of movement of the machine element including the carrier 4 and the spindle 7.

A preferably elastic cover 31a can be affixed to the underside of the carrier 4 and/or to the front side of the topmost portion 21' of the plate-like member 21 to overlie the clearance 28 and to thus further reduce the likelihood of penetration of coolant, lubricant and/or particles of removed materil from the work area 22 into contact with the guideways 3, motor 8, spindles 7, 23 and motor 24.

In the grinding machine of FIG. 1, the motor 24 is secured to the rear side of the support 13 so that the prime mover means 23, 24 for the plate-like member 21 of the guard shares all movements of the support 13 along the guideways 12. However, it is equally possible to mount the motor 24 directly on the base or bed 1. If the vessel 18 is mounted on the support 13, it is presently preferred to mount the motor 24 on the support because this renders it possible to ensure that the lowermost or bottom portion 21'' of the member 21 dips into the supply of coolant and/or lubricant which gathers in the vessel 18. Such mounting of the member 21 even further reduces the likelihood of penetration of a liquid medium and/or solid particles from the work area 22 into contact with the sensitive parts of the grinding machine including the guideways 3, the motors 8, 24 and the spindles 9, 23.

In lieu of controlling the movements of the member 21 in response to signals from the monitoring device 27 on the member 21, the circuit 29 can be directly connected with the motor 8 of the prime mover means for the machine element including the carrier 4 and tool spindle 7. This is indicated by a broken line 32. Such direct connection between the control circuit 29 on the one hand and the motors 8 and 24 on the other hand even further ensures accurate synchronization of all movements of the machine element 4, 7 with those of the plate-like member 21.

FIG. 1 further shows that the guard can include several components or parts which are telescoped into each other. Thus, this guard can comprise a stationary component 21a which can have a U-shaped or other suitable cross-sectional outline and is mounted on the housing of the motor 24 and/or on the vessel 18. The plate-like member 21 is telescoped into the component 21a and is movable relative to this component up and down with the feed screw 23 in synchronism with movements of the machine element including the carrier 4 and tool spindle 7.

An important advantage of the improved machine tool is that the accuracy of movements of the grinding wheel 6 relative to the workpiece 17 on the table 16 at the work area 22 is not affected by the bulk, weight and/or other parameters of the guard (21 or 21, 21a) for the guideways 3 and other sensitive parts of the machine behind the work area. Thus, the motor 8 need not drive the plate-like member 21 and the motor 24 need not drive the carrier 4. This ensures that friction (if any) between the member 21 and the second component 21a of the guard cannot influence the accuracy of treatment of workpieces on the table 16 as well as that friction between the feed screw 23 and its bearing or bearings cannot exert an adverse influence upon the material removing operation. In other words, the movements of those mobile parts (particularly of the carrier 4 and tool spindle 7) which can directly influence the accuracy of treatment of successive workpieces are independent of movements of the mobile member or members of the guard.

Another important advantage of the improved machine tool is that the width of the clearance 28 remains minimal or can be reduced to zero even though the mobile member 21 of the guard is not directly secured to the carrier 4. This is achieved by the provision of the operating means including the monitoring device 27 and control circuit 29. An advatage of a direct connection (32) between the control circuit 29 and the motor 8 of the prime mover means for the carrier 4 is that the monitoring device 29 can be dispensed with. An input of the control circuit 29 is connected with the central control unit 47 of the grinding machine. This central control unit transmits signals which initiate starting or stoppage of the motors 8, 19 and of other motor or motors, such as the motor which drives the tool spindle 7 and the motor which can move the table 16 along the guideways 14 on the support 13.

The width of the clearance 28 which is shown in FIG. 1 is greatly exaggerated for the sake of clarity and to point out the absence of a direct motion transmitting connection between the mobile member 21 of the guard and the carrier 4 of the machine element further including the tool spindle 7. As a rule, the width of the clearance 28 is minimal, negligible or zero. This can be readily achieved by resorting to the aforediscussed operating means including the monitoring device 27 and/or control circuit 29. The width of the clearance 28 can be increased without adversely affecting the barrier between the work area 22 and the guideways 3 if the machine is provided with the aforediscussed elastic cover 31a or analogous means for bridging the clearance between the topmost portion 21' of the mobile member 21 and the underside of the carrier 4. As mentioned above, reliable sealing of the guideways 3 from the work area 22 enhances the accuracy of the treatment of workpieces at the station above the table 16 because the movements of the machine element 4, 7 are more predictable for practically unlimited periods of time.

Instead of employing a guard with two telescoped components 21, 21a of the type shown in FIG. 1, the grinding machine can be provided with a guard employing telescoped components of the type disclosed, for exampl, in U.S. Pat. No. 4,670,964 or in U.S. Pat. No. 4,607,460. These patents disclose guards in the form of sheet-metal components and guards in the form of tunnels with components telescoped into one another. The disclosures of these patents are incorporated herein by reference.

Figure 2:
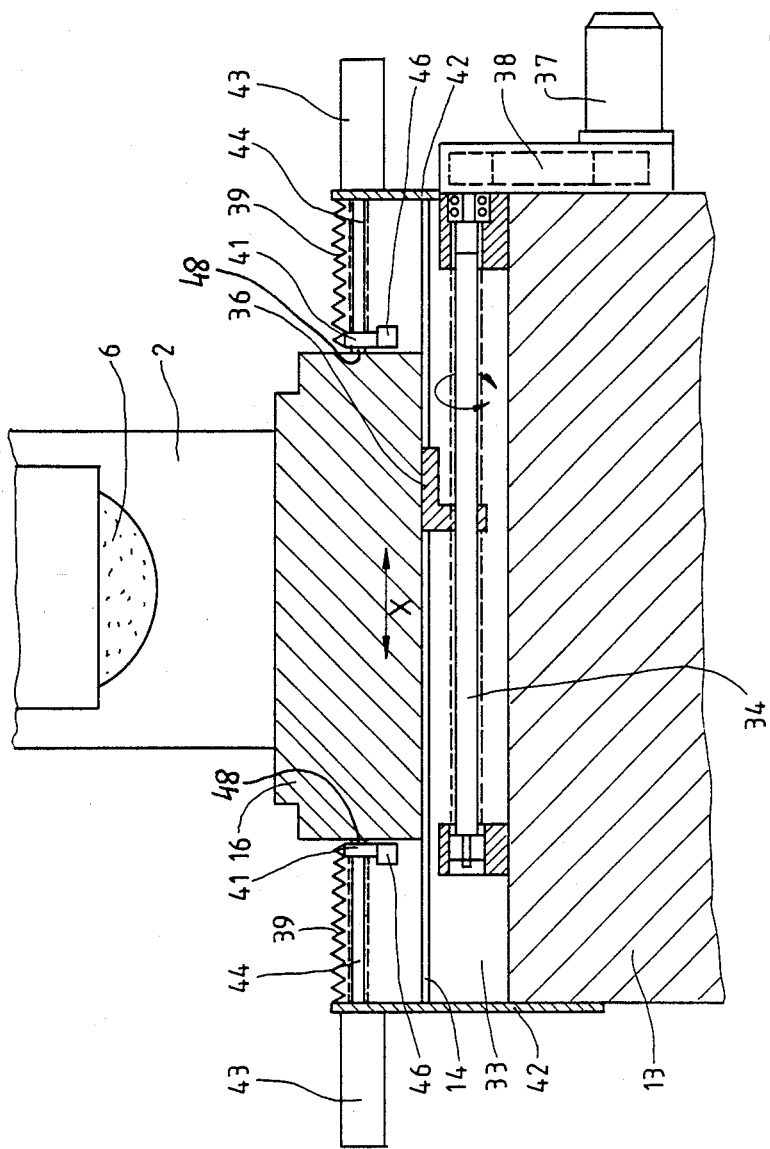
FIG. 2 enlarged fragmentary partly front elevational and partly vertic sectional view of second grinding machine and FIG. 3 similar partly front elevational and partly vertical sectional view of a third grinding machine constituting a modification of the machine which is shown in FIG. 2.

FIG. 2 shows a portion of a second grinding machine. All such parts of this machine which are identical with or clearly analogous to the corresponding parts of the grinding machine of FIG. 1 are denoted by similar reference characters. The support 13 of the grinding machine of FIG. 2 carries guideways 14 for the table 16 which is disposed at a level beneath the grinding wheel 6. The latter can be mounted in the same way as described in connection with FIG. 1. The table 16 is movable along the guideways 14 in directions which are indicated by the double-headed arrow X, i.e., at right angles to the axis of rotation of the spindle for the grinding wheel 6. The prime mover means for the table 16 includes a reversible motor 37 which is mounted on the support 13, a ball screw drive 34 in a channel 33 between the guideways 14 (see also FIG. 1), a nut 36 which is affixed to the underside of the table 16 and mates with the screw drive 34, and a toothed belt drive 38 between the output element of the motor 37 and the drive 34.

The end portions of the guideways 14 at both sides of the table 16 are shielded by guards in the form of bellows 39. The outer end portions of the bellows 39 are affixed to upwardly extending sidewalls 42 which are secured to the support 13, and the inner end portions of these bellows are affixed to followers 41 which are affixed to the free end portions of discrete feed screws 44 extending in parallelism with the guideways 14 and being connected with the rotary output elements of discrete motors 43 at the outer sides of the respective sidewalls 42. The followers 41 carry monitoring devices 46 which generate signals denoting the width of clearances between the followers 41 and the respective sides of the table (machine element) 16. The monitoring devices 46 transmit signals to a control circuit (corresponding to the control circuit 29 in the grinding machine of FIG. 1) which regulates the operation of the motors 43 in such a way that the width of clearances between the followers 41 and the adjacent sides of the table 16 remains unchanged irrespective of the direction and/or speed of movement of the table 16 along the guideways 14. This ensures that the guideways 14 are invariably shielded against contact with coolant, lubricant and/or solid particles tending to leave the work area above the table 16.

The operating means for the prime mover means 43, 44 for each of the bellows 39 shown in FIG. 2 can be modified in the same way as described in conection with FIG. 1 in order to even further enhance the synchronization of movements of the followers 41 with those of the table 16. Thus, the control circuit (corresponding to the circuit 29 in the grinding machine of FIG. 1) which transmits signals to the motor 37 of the prime mover means for the table 16 can be designed to transmit signals directly to the motors 43 so that the monitoring devices 46 can be omitted. As mentioned above, the control circuit 29 for the motor 24 or motors 8, 24 of FIG. 1 and the corresponding control circuit for the motor 37 of FIG. 2 receive signals from the main control unit 47 of the grinding machine.

The reference characters 48 denote in FIG. 2 two elastic inserts or plugs which can be said to constitute covers or shrouds in that they seal the clearances between the followers 41 and the respective sides of the table 16.

The structure which is shown in FIG. 2 can be incorporated into the machine tool of FIG. 1. Additional guards can be provided to overlie the exposed portions of the guideways 12 on the base or bed 1.

FIG. 3 shows a portion of a grinding machine which constitutes a modification of the grinding machine of FIG. 2. The main difference is that the prime mover means (including the feed screws 44) for the followers 41 at the inner ends of the bellows 39 need not include discrete motors 43. Instead, such prime mover means include motion transmitting means which derive motion from the ball screw drive 34 of the prime mover means for the table 16 and can rotate the feed screws 44. The illustrated motion transmitting means comprise two toothed belt transmissions 49 which include pulleys mounted on the respective end portions of the ball screw drive 34. It is clear that the transmissions 49 can be replaced with other types of motion transmitting means without departing from the spirit of the invention.

FIG. 3 further shows additional covers in the form of eaves 31 which are affixed to or form integral parts of the table 16 and overlie the followers 41 in order to further reduce the likelihood of penetration of liquid and/or solid contaminants into the gaps or clearances between the followers 41 and the respective sides of the table.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine tool, particularly a grinding machine, comprising a frame; guide means provided on said frame; at least one machine element movable along said guide means; at least one mobile guard for said guide means; first prime mover means for said machine element; and discrete second prime mover means for said guard.

2. The machine tool of claim 1, further comprising means for operating said second prime mover means so that said guard follows the movements of said machine element along said guide means.

3. The machine tool of claim 2, wherein said guard and said machine element define a clearance, said operating means including signal generating means for monitoring said clearance and means for controlling said second prime mover means in response to signals from said monitoring means so as to maintain the width of said clearance at a constant value.

4. The machine tool of claim 3, wherein the width of said clearance is a minute fraction of one inch.

5. The machine tool of claim 2, wherein said operating means includes means for operating said second prime mover means in synchronism with said first prime mover means.

6. The machine tool of claim 1, wherein said guard includes at least one bellows.

7. The machine tool of claim 1, wherein said guard comprises first and second components one of which is telescoped into the other of said components, at least said first component being movable by said second prime mover means relative to said second component.

8. The machine tool of claim 1, wherein said frame includes a column and said guide means is provided on and extends substantially vertically along said column, said machine element comprising a carrier which is reciprocable along said guide means and at least one rotary tool spindle journalled in said carrier, said guard including a substantially plate-like member which overlies said guide means.

9. The machine tool of claim 8, wherein said carrier is disposed at a level above said guard and said guard includes a topmost portion which is closely adjacent said carrier, said second prime mover means including means for moving said guard up and down with reference to said guide means so that said topmost portion remains closely adjacent said carrier.

10. The machine tool of claim 9, further comprising means defining a work area for the tool on said spindle, means for supplying a coolant into said work area, and means for collecting coolant which is supplied to said work area, said guard having a bottom portion arranged to dip into the coolant in said collecting means.

11. The machine tool of claim 10, wherein said spindle is rotatable about a substantially horizontal axis and said collecting means comprises an elongated vessel extending transversely of said axis.

12. The machine tool of claim 11, wherein said work area defining means includes a table beneath said spindle, said vessel being disposed between said table and said guide means.

13. The machine tool of claim 1, wherein said guard and said machine element define a clearance and further comprising at least one cover overlying said clearance.

14. The machine tool of claim 1, further comprising means for transmitting motion between said first and second prime mover means.

* * * * *